(12) United States Patent
Reddy et al.

(10) Patent No.: US 9,929,911 B1
(45) Date of Patent: Mar. 27, 2018

(54) AUTOMATIC CONFIGURATION OF VIRTUAL NETWORK SWITCHES

(71) Applicant: Juniper Networks, Inc., Sunnyvale, CA (US)

(72) Inventors: Rajashekar Reddy, San Jose, CA (US); Ankur Singla, Belmont, CA (US); Harshad Bhaskar Nakil, San Jose, CA (US); Pedro R. Marques, Mountain View, CA (US); Ashish Ranjan, San Ramon, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 86 days.

(21) Appl. No.: 14/921,069

(22) Filed: Oct. 23, 2015

Related U.S. Application Data

(63) Continuation of application No. 14/228,231, filed on Mar. 27, 2014, now Pat. No. 9,172,609, which is a continuation of application No. 13/230,255, filed on Sep. 12, 2011, now Pat. No. 8,705,353, which is a continuation of application No. 12/835,549, filed on Jul. 13, 2010, now Pat. No. 8,018,891, which is a (Continued)

(51) Int. Cl.
*H04L 12/26* (2006.01)
*H04L 12/28* (2006.01)
*H04L 12/24* (2006.01)
*H04L 12/775* (2013.01)

(52) U.S. Cl.
CPC ...... *H04L 41/0886* (2013.01); *H04L 41/0893* (2013.01); *H04L 45/58* (2013.01)

(58) Field of Classification Search
None
See application file for complete search history.

(56) References Cited

U.S. PATENT DOCUMENTS

| 6,195,356 B1 * | 2/2001 | Anello | H04L 12/462 370/398 |
| 7,209,435 B1 * | 4/2007 | Kuo | H04L 45/00 370/219 |

(Continued)

OTHER PUBLICATIONS

Prosecution history of U.S. Appl. No. 11/818,164 dated Nov. 9, 2009 through May 5, 2010, 34 pp.

(Continued)

*Primary Examiner* — Chi H Pham
*Assistant Examiner* — Soon-Dong D Hyun
(74) *Attorney, Agent, or Firm* — Shumaker & Sieffert, P.A.

(57) ABSTRACT

In general, techniques are described in which a plurality of network switches automatically configure themselves to operate as a single virtual network switch. A virtual switch is a collection of individual switch devices that operate like as single network switch. As described herein, network switches in a network that are capable of participating in a virtual switch may automatically discover one another. The participating network switches may then elect one of the participating switches as a master switch. The master switch may generate forwarding information and store the forwarding information in the participating switches, including the master switch. The forwarding information causes the participating switches to act like a single network switch.

18 Claims, 9 Drawing Sheets

Related U.S. Application Data continuation of application No. 11/818,164, filed on Jun. 13, 2007, now Pat. No. 7,756,027.

(56) References Cited

U.S. PATENT DOCUMENTS

| | | | |
|---|---|---|---|
| 7,457,256 B2 * | 11/2008 | Ivaldi | H04L 12/28 |
| | | | 370/256 |
| 7,558,195 B1 * | 7/2009 | Kuo | H04L 45/00 |
| | | | 370/219 |
| 7,574,491 B2 | 8/2009 | Stein et al. | |
| 7,724,653 B2 * | 5/2010 | Konuma | H04L 49/351 |
| | | | 370/220 |
| 7,751,416 B2 | 7/2010 | Smith et al. | |
| 7,756,027 B1 | 7/2010 | Reddy et al. | |
| 7,792,148 B2 * | 9/2010 | Carlson | H04L 12/413 |
| | | | 370/474 |
| 7,817,541 B2 | 10/2010 | Gray et al. | |
| 8,018,891 B2 | 9/2011 | Reddy et al. | |
| 8,705,353 B1 | 4/2014 | Reddy et al. | |
| 9,172,609 B1 | 10/2015 | Reddy et al. | |
| 2003/0135645 A1 * | 7/2003 | Oki | H04L 43/00 |
| | | | 709/238 |
| 2005/0180391 A1 | 8/2005 | Shimada | |
| 2006/0018302 A1 | 1/2006 | Ivaldi et al. | |
| 2006/0251065 A1 | 11/2006 | Hamamoto et al. | |
| 2006/0253619 A1 * | 11/2006 | Torudbakken | G06F 13/4022 |
| | | | 710/31 |
| 2007/0036178 A1 | 2/2007 | Hares et al. | |
| 2007/0104192 A1 * | 5/2007 | Yoon | H04L 12/4641 |
| | | | 370/389 |
| 2007/0183313 A1 | 8/2007 | Narayanan et al. | |
| 2008/0275975 A1 * | 11/2008 | Pandey | H04L 49/70 |
| | | | 709/223 |

OTHER PUBLICATIONS

Prosecution history of U.S. Appl. No. 12/835,549 dated Feb. 2, 2011 through Jun. 9, 2011, 13 pp.

Prosecution history of U.S. Appl. No. 13/230,255 dated Feb. 11, 2013 through Nov. 22, 2013, 53 pp.

Prosecution history of U.S. Appl. No. 14/228,231 dated Mar. 11, 2015 through Jun. 25, 2015, 24 pp.

* cited by examiner

AUTOMATIC CONFIGURATION OF VIRTUAL NETWORK SWITCHES

This application is a continuation of U.S. patent application Ser. No. 14/228,231, filed Mar. 27, 2014, which is a continuation of U.S. patent application Ser. No. 13/230,255, filed Sep. 12, 2011, now U.S. Pat. No. 8,705,353, which is a continuation of U.S. patent application Ser. No. 12/835,549, filed Jul. 13, 2010, now U.S. Pat. No. 8,018,891, which is a continuation of U.S. patent application Ser. No. 11/818,164, filed Jun. 13, 2007, now U.S. Pat. No. 7,756,027, the entire contents of each being hereby incorporated by reference.

TECHNICAL FIELD

The invention relates to computer networks, and particularly to intermediate network devices.

BACKGROUND

A computer network is a collection of interconnected computing devices that can exchange data and share resources. The Open Systems Interconnection ("OSI") model of a network comprises seven layers. A layer two ("L2") network protocol may, for example, handle framing of data and interface between the higher layers and the physical layer. Ethernet is one example of a L2 communication protocol. Network switches are an example of L2 devices which participate in the exchange of data. Network switches connect a plurality of network devices to each other. A device connected to one port of a network switch is typically able to communicate directly with any other device connected to another port of that network switch.

For example, a network switch operating at the data link layer of the OSI model may forward link-layer frames within an L2 network. That is, the network switch may receive a link-layer frame on a first port of the network switch. If a second port of the network switch is associated with a Media Access Control (MAC) address specified by the link-layer frame, the network switch outputs the link-layer frame on the second port. By outputting link-layer frames in this manner, the network switch of this example may connect two or more link-layer network segments.

SUMMARY

In general, techniques are described by which a plurality of layer two ("L2") network switches automatically discover and configure themselves to operate as a single virtual L2 network switch. A virtual switch, as referred to herein, means a collection of individual L2 switch devices that are physically interconnected and configured (i.e., "stacked") to operate like as single L2 network switch as if the individual L2 switch devices were located within the same physical chassis.

According to one aspect of this disclosure, the L2 network switches that are capable of participating in a virtual switch may implement techniques to automatically discover one another as well as the topology by which the L2 network switches are physically connected. That is, the L2 switches utilize an auto-discovery protocol to discover the physical ports that are used to interconnect the switches and the particular ports provide connectivity to other switches that support stacking. Based on the discovered connection topology, the devices proceed to auto-provision themselves to operate as a virtual switch. In this way the techniques may, for example, entirely avoid any manual configuration of the individual switches with regard to stacking and formation of the virtual network switch. Once configured, the L2 network switches perform L2 switching functions on L2 network traffic as if a single L2 switch.

According to another aspect of this disclosure, the participating L2 network switches may elect one of the participating switches as a master switch to control operation and programming of L2-L7 tables of the single virtual switch. For example, the master switch may enable certain modules that support L3 network functions to generate forwarding information and distribute the forwarding information in the participating switches. The slave L2 network switches may utilize the forwarding information to forward L3 network traffic, such as network packets.

For example, according to this aspect of the disclosure, a first switch may operate as a master switch of a virtual switch. As the master switch, the first switch may enable certain L3 functions to receive, from peer routers, routing protocol messages that contain L3 topology information. The master switch may use the topology information to identify a best route from any of the network interfaces of any of the participating network switches to a network device associated with a first network address. In this example, the best route may originate from a first network interface of a second one of the participating network switches. The master switch may then generate forwarding information that instructs the participating network switches to forward network-layer packets that specify this network address such that the first network interface outputs the network packets. For instance, the first switch, the master switch, and a third switch may be participating in a virtual switch. The first switch (i.e., the master switch) may be connected to the second switch, and the third switch may be connected to the first switch. In this case, the master switch may generate forwarding information that instructs the second network switch to forward network-layer packets that specify the first network address using the first network interface without going through multiple bridging functions. Furthermore, the master switch may generate forwarding information that instructs the first switch to forward network packets that specify the first network address to the second network switch. In addition, the master switch may generate forwarding information that instruct the third switch to forward network packets that specify the first network address to the first network switch, which will subsequently forward the network packets to the second network switch. In this way, network switches may provide L2 switching functions as a virtual switch and also operate as virtual interface cards for a virtual L3 router controlled by the master switch.

In one aspect, a method comprises executing a link layer (L2) discovery protocol within an L2 network switch to receive L2 configuration parameters from other L2 switching devices in a network. The method also comprises identifying, based on the L2 configuration parameters, a set of the L2 switching devices that are capable of participating as part of a virtual L2 switch. In addition, the method comprises executing a network layer (L3) routing protocol within the L2 network switch to exchange L2 information with the identified set of L2 switching devices. The method also comprises determining L2 topology information for the set of L2 networks switches based on the exchanged L2 configuration information. In addition, the method comprises distributing forwarding information to the set of L2 switching devices. The method also comprises operating the identified L2 switching devices as a single virtual switch.

In another aspect, a device comprises a plurality of network interfaces that facilitate communication with neighboring L2 switching devices. The device also comprises a device discovery module that automatically identifies a set of L2 switching devices in a network that are capable of participating as part of a virtual switch. The L2 switching devices are coupled to one another in an arbitrary network topology. In addition, the device comprises a table generation module that, when enabled, automatically stores, in the identified L2 switching devices, forwarding information that causes the identified L2 switching devices to operate as a single virtual switch.

In another aspect, a computer-readable medium comprises instructions. The instructions cause a programmable processor to automatically identify a set of L2 switching devices in a network that are capable of participating as part of a virtual switch. The L2 switching devices are coupled to one another in an arbitrary network topology. The instructions also cause the processor to automatically store, in the identified L2 switching devices, forwarding information that causes the identified L2 switching devices to operate as a single virtual switch.

In another aspect, a system comprises a set of network L2 switching devices. The system also comprises a set of communications links that facilitate communication among the network L2 switching devices according to an arbitrary network topology. Each of the L2 switching devices comprises a plurality of network interfaces that facilitate communication with sets of neighboring L2 switching devices. Each of the L2 switching devices also comprises a device discovery module that automatically identifies a set of L2 switching devices in a network that are capable of participating as part of a virtual switch. In addition, each of the L2 switching devices also comprises a table generation module that, when enabled, automatically stores, in the identified L2 switching devices, forwarding information that causes the identified L2 switching devices to operate as a single virtual switch.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
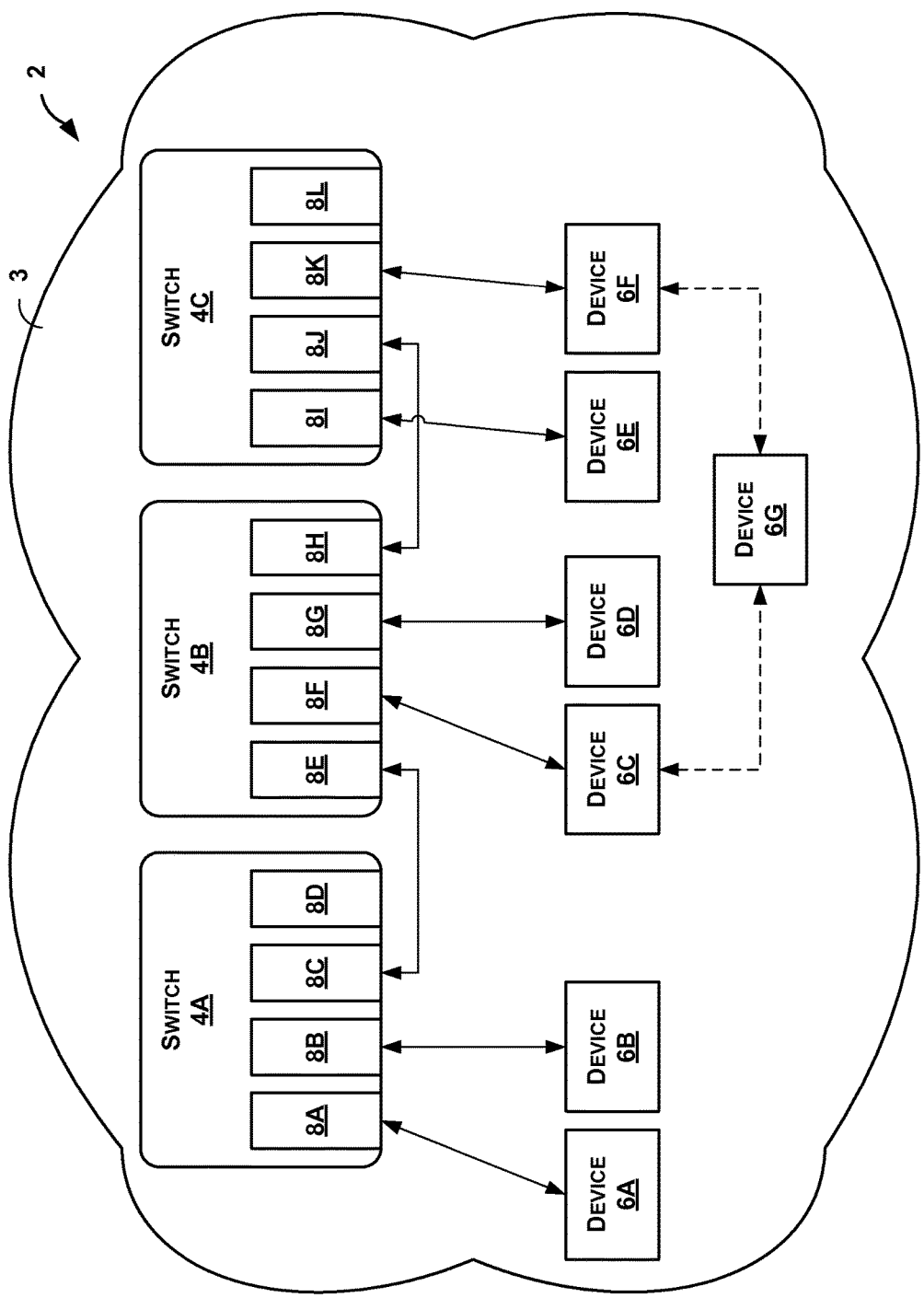
FIG. 1 is a block diagram illustrating an exemplary network system.

FIG. 1 is a block diagram illustrating an exemplary network system 2. Network system 2 includes a network 3 that includes a set of network switches 4A through 4N (collectively, "switches 4") and a set of network devices 6A through 6G (collectively, "devices 6"). Devices 6 represent other devices located within the topology of network 3, and may be routers, personal computers, servers, network security devices, television set-top boxes, mobile telephones, mainframe computers, super computers, network devices integrated into vehicles, or other types of network devices.

Switches 4 and network devices 6 may communicate through a set of links. Such links are presented in the example of FIG. 1 as lines. These links may be wired or wireless communication links. For example, these links may be Ethernet links, fiber optic links, Wi-Fi links, mobile broadband links, or other types of communication links.

Each of switches 4 includes a set of network interfaces, i.e., physical ports for connection to an individual network link. As illustrated in the example of FIG. 1, switch 4A includes network interfaces 8A, 8B, 8C, and 8D, switch 4B includes network interfaces 8E, 8F, 8G, and 8H, and switch 4C includes network interfaces 8I, 8J, 8K, and 8L. Although the example of FIG. 1 only shows four network interfaces in each of switches 4, switches 4 may include more network interfaces or fewer network interfaces. For instance, switches 4 may include twenty-four to forty-eight network interfaces. Each of these network interfaces may send data to and receive data from various ones of switches 4 and devices 6.

Switches 4 perform L2 switching operations to forward L2 traffic and, therefore, may be viewed as L2 switches, such as high-speed Ethernet switches. Switches 4 may be interconnected (i.e., "stacked") in any arbitrary topology. For example, switches 4 may be arranged in a ring topology, a star topology, a fully connected topology, a line topology, a tree topology, a mesh topology, a bus topology, or another type of network topology. Furthermore, switches 4 may be connected to one another through any of the network interfaces in switches 4. As illustrated in the example of FIG. 1, the network interface 8C of switch 4A is connected to a link that is coupled to network interface 8E of switch 4B and network interface 8H of switch 4B is coupled to a link that is coupled to network interface 8J of switch 4C. In this example, switches 4A, 4B, and 4C are connected in a line topology. It may be immaterial which ones of the network interfaces of switches 4 are coupled to links that are coupled to other ones of switches 4. In other words, switches 4 do not need to be connected via special interfaces, but instead may be connected to one another by ordinary network interfaces.

Switches 4 execute a protocol for automatically discovering one another as well as the topology by which the network switches are physically connected. That is, the L2 switches utilize the auto-discovery protocol to discover the physical ports that are used to interconnect the switches and the particular ports provide connectivity to other switches that support stacking. Based on the discovered connection topology, the devices proceed to auto-provision themselves to operate as a virtual switch. A virtual switch is a collection of individual switch devices that operate like a single network switch to provide L2 forwarding functions as if the individual L2 switch devices were located within the same physical chassis.

As L2 devices, switches 4 typically "learn" of other L2 devices coupled to each port and maintain state information to reflect this learning. For example, over time, switches 4 receive L2 communications from devices within network 3 and learn particular destination Media Access Control (MAC) addresses downstream from each network interface 8, i.e., port. Whenever any of switches 4 receives an L2 network communication, switches 4 forward the network communication to the appropriate network interface 8 based on the MAC address specified by the network communication. If the MAC address has not yet been associated with a particular port, i.e., one of network interfaces 8, the forwarding switch 4 broadcasts the L2 network communication on all of its network interfaces 8.

In order to automatically configure themselves to operate as a single virtual switch, each one of switches 4 may independently identify L2 devices in network 3 that are capable of participating in a virtual network switch. Switches 4 may independently begin a process to identify other devices that capable of participating in the virtual switch by sending link-layer protocol data units to neighboring devices and receive link-layer protocol data units from neighboring devices. For example, switches 4 may independently send Link-Layer Discovery Protocol (LLDP) data units. Neighboring devices are network devices that are connected to a single network segment. In other words, neighboring devices are network devices that communicate using the same physical layer. In the example of FIG. 1, device 6A, device 6B, and switch 4B are neighboring devices of switch 4A.

The link-layer data units include L2 configuration parameters regarding respective ones of switches 4. The L2 configuration parameters regarding one of switches 4 may indicate address information (e.g., IP address, Media Access Control (MAC) addresses, etc.) and may indicate whether the switch is capable of participating as part of a virtual switch. In addition, the L2 configuration parameters may specify other information about switches 4. For example, a data unit sent by switch 4A may include L2 configuration parameters that specify a version of software executing on switch 4A, a length of time that switch 4A has been operating since the last reboot, a processing speed of a processor in switch 4A, line speeds of links to switch 4A, and other parameters.

When one of switches 4 receives a link-layer protocol data unit from a neighboring device, the switch may incorporate L2 configuration parameters specified by the data unit into a management information base (MIB). In this way, each one of switches 4 independently collects the device information about each of their neighboring devices.

In accordance with the techniques described herein, L2 switches 4 include certain features for performing L3 peer-to-peer communications. For example, after receiving L2 configuration parameters from neighboring switches, each of switches 4 may then use a network-layer protocol (i.e., an L3 protocol) to exchange the L2 configuration information in their MIBs. For example, switches 4 may use an Intermediate System to Intermediate System (IS-IS) routing protocol to exchange L2 configuration parameters in their respective MIBs. For instance, switch 4A may send out IS-IS messages on each network interface of switch 4A. These IS-IS messages may specify L2 configuration parameters of switch 4A and L2 configuration parameters of each device that neighbors switch 4A. When another one of switches 4 receives one of the IS-IS messages sent by switch 4A, this switch may use the L2 configuration parameters in the IS-IS message identify an L2 topology of network 3, and may forward the IS-IS message to each device that neighbors the switch. This process continues until each of switches 4 has received an IS-IS message sent by switch 4A. Switches 4 may send out such IS-IS messages on a periodic basis. Alternatively, switches 4 may send out such IS-IS messages whenever the configuration parameters of switches 4 or devices that neighbor switches 4 change. In this way, switches 4 utilize an L3 routing communication protocol to collect and exchange L2 configuration parameters of each of the L2 switches 4 that is capable of participating in a virtual L2 switch.

In addition, each of switches 4 may use the collected L2 configuration parameters to elect one of switches 4 as a master switch. In order to elect one of switches 4 as a master switch, each of switches 4 may use the collected configuration parameters to determine the relative qualifications of switches 4 to be the master switch. In this way, switches 4 may identify a list of switches 4, ordered from highest-priority to lowest-priority by relative qualification to be the master switch. In other words, each of switches 4 may identify a list of switches 4 that ranks each of switches 4 according to how qualified each of switches 4 are to be the master switch. For example, each of switches 4 may determine that switch 4B is the best qualified switch, that switch 4C is the second best qualified switch, and that switch 4A is the third best qualified switch. In this example, switch 4B is elected master switch because switch 4B is best qualified to be the master switch. Because all of switches 4 have received the same information, each of switches 4 typically elect the master switch without the need to collect votes in a central location. This disclosure refers to these remaining switches as "servant switches."

When one of switches 4 determines that it is the master switch, this master switch may associate network interfaces of switches 4 with distinct sets of L2 addresses. For example, the master switch may associate network interfaces of switches 4 with distinct sets of MAC addresses. In this example, the master switch may associate MAC address "00-08-74-4C-7F-1D" with network interface 8A of switch 4A, MAC address "00-08-4D-2D-2A-3E" with network interface 8B of switch 4B, and a MAC address "01-25-47-A2-D1-FF" with a network interface 8K of switch 4C. In another example, the master switch may associate network interfaces of switches 4 with distinct sets of IP addresses.

Next, the master switch may automatically distribute L2 forwarding information in each of switches 4. The master switch may generate the forwarding information such that the master switch and the servant switches act as a single virtual L2 switch. When switches 4 receive L2 network communications, switches 4 forward the L2 network communications in accordance with this forwarding information. The forwarding information generated by the master switch causes switches 4 to forward network communications such that the network interfaces that are associated with destination addresses specified by the network communications output the network communications. Continuing the MAC address example of the previous paragraph, network interface 8H of switch 4B may receive an Ethernet frame that specifies "00-08-74-4C-7F-1D" as a destination MAC address. In this example, the forwarding instructions stored in switch 4B may instruct switch 4B to output Ethernet frames with MAC address "00-08-74-4C-7F-1D" on network interface 8E of switch 4B. Consequently, network interface 8C of switch 4A receives the Ethernet frame. The forwarding instructions stored in switch 4A may instruct switch 4A to output Ethernet frames with MAC address "00-08-74-4C-7F-1D" on network interface 8A of switch 4A. In this way, the forwarding instructions stored in switches 4 cause switches 4 to forward the Ethernet frame such that the network interface that is associated with the destination address specified by the Ethernet frame (i.e., network interface 8A of switch 4A) outputs the Ethernet frame.

In addition, the elected master switch may enable certain L3 functionality in order to use L3 route information to associate the network interfaces with distinct sets of network-layer addresses. For example, the master switch may receive L3 routing protocol messages from devices in network 3. The routing protocol messages may describe an L3 topology of network 3. The master switch may use this topology to identify routes to devices in network 3. As illustrated in the example of FIG. 1, the master switch may use the topology to identify a first route from network interface 8K of switch 4C to device 6G and a second route from network interface 8F of switch 4B to device 6G. In this example, the master switch may determine that the second route is better than the first route. Based on this determination, the master switch may associate network interface 8K of switch 4C with the network address associated with device 6G and may generate forwarding information accordingly. Consequently, whenever any of switches 4 receives a network packet that specifies the network address associated with device 6G, switches 4 may forward the network packet such that network interface 8K of switch 4C outputs the network packet. Because network interface 8K of switch 4C outputs the network packet, the network packet may follow the first route to device 6G.

The techniques described in this disclosure may provide several advantages. For instance, the techniques allow L2 switching devices to automatically form L2 virtual switches. This may provide significant time savings compared to systems in which an administrator must manually configure L2 switches to operate as "stacked" switches. Furthermore, these techniques may allow the switches to be arranged in an arbitrary topology, such as a line or star topology. This may be advantageous compared to systems in which "stacked" switches must be arranged in a ring topology. In addition, these techniques may allow switches to be connected to one another using standard network interfaces. This may be advantageous compared to "stacked" switches that must be connected using special purpose interfaces. Furthermore, these techniques may allow sets of L2 devices to also operate as a virtual network-layer (L3) device that potentially includes a master devices and a large number of network interfaces, as provided by the slave L2 switches. Many conventional network-layer routing devices are deployed as blades in a rack. Due to space constraints of the rack, the number of network interfaces that may be included in a typical network-layer switch is limited. These techniques allow the deployment of multiple switches that act as a single network-layer switch. This may overcome the limitation on the number of line cards due to physical space limitations.

Figure 2:
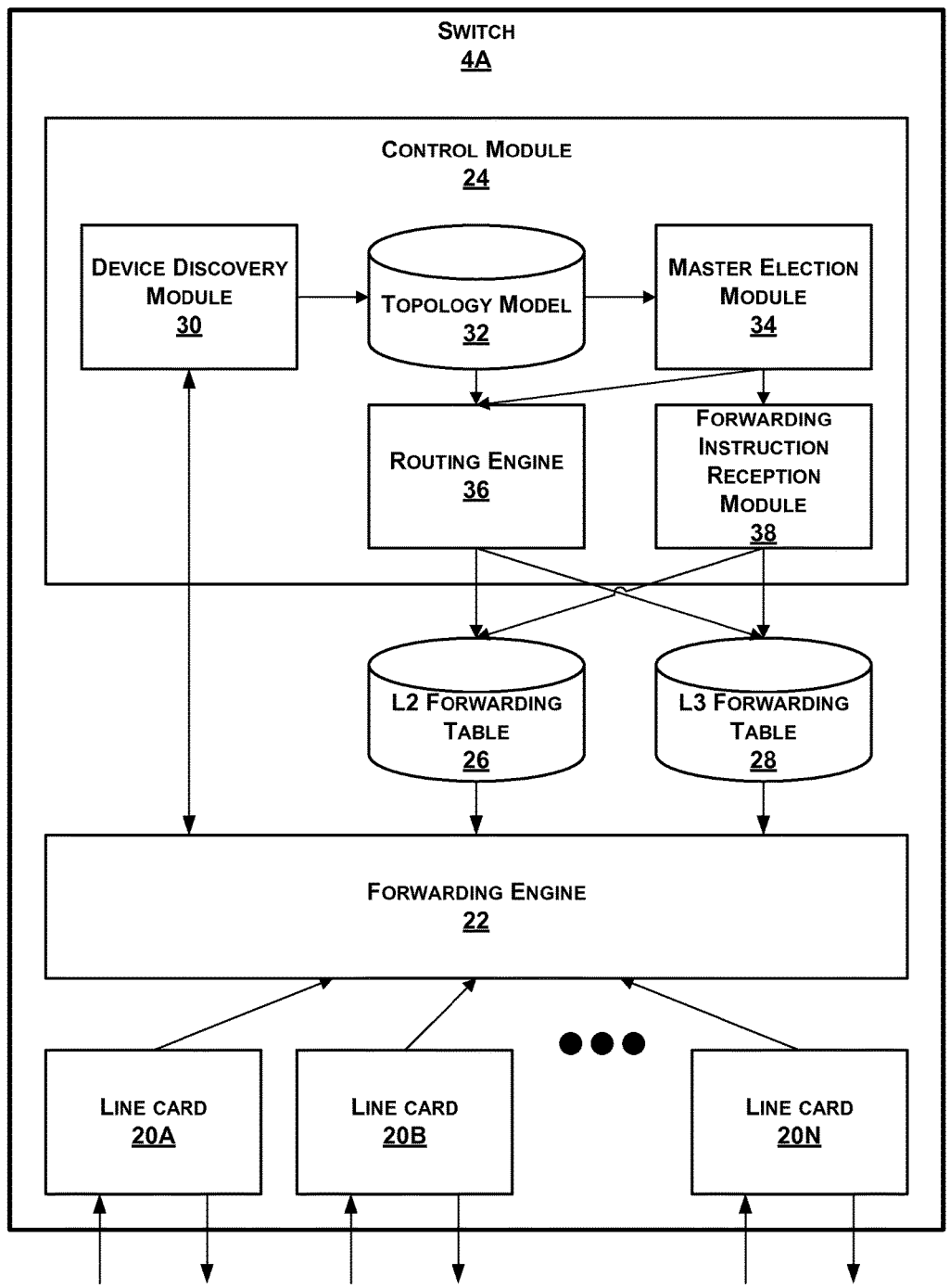
FIG. 2 is a block diagram illustrating exemplary details of a switch that is capable of participating in a virtual switch.

FIG. 2 is a block diagram illustrating exemplary details of an L2 network switch 4A. As illustrated in the example of FIG. 2, switch 4A may comprise a set of line cards 20A through 20N (collectively, "line cards 20"), a forwarding engine 22, and a control module 24.

Line cards 20 provide a set of physical network ports and may be Ethernet interface cards, token ring interface cards, wireless interface cards (e.g., Wi-Fi, WiMax, wireless broadband, Bluetooth, etc.), fiber optic interfaces, dial-up interfaces, or other types of network interfaces. Line cards 20 may send and receive link-layer frames on a link. When one of line cards 20 receives a link-layer frame, the line card may forward the link-layer frame to forwarding engine 22.

Forwarding engine 22 may comprise one or more switching application-specific integrated circuits (ASICs) that forward network communications received by line cards 20. For instance, when forwarding engine 22 receives a link-layer frame from one of line cards 20, forwarding engine 22 may first determine whether the link-layer frame is destined for switch 4A itself, i.e., specifies a MAC address of switch 4A. Otherwise, forwarding engine 22 uses forwarding information an L2 forwarding table 26 to determine how to forward the link-layer frame. L2 forwarding table 26 may contain entries that map various MAC addresses to various ones of line cards 20. For example, L2 forwarding table 26 may contain an entry that maps the MAC address "00-1A-53-DC-7F-5D" to devices connected to line card 20B. When forwarding engine 22 receives a link-layer frame that specifies a MAC address other than a MAC address of switch 4A, forwarding engine 22 may scan through L2 forwarding table 26 in order to find an entry that maps this specified MAC address to one of line cards 20. Forwarding engine 22 may then forward the link-layer frame to the one of line cards 20 specified by the entry in L2 forwarding table 26. The specified line card may then forward the link-layer frame on the network link coupled to the line card. Continuing the previous example, if forwarding engine 22 receives a link-layer frame that specifies the MAC address "00-1A-53-DC-7F-5D", forwarding engine 22 may forward the link-layer frame to line card 20B. If forwarding engine 22 receives an L2 communication that specifies a destination MAC address that is not identified within the L2 state information provided by L2 forwarding table 26, forwarding engine 22 may broadcast the L2 communication to all of the ports of line cards 20.

If the link-layer frame specifies a MAC address of switch 4A, forwarding engine 22 may collect a set of one or more link-layer frames that constitute a network-layer packet. Forwarding engine 22 may then use an L3 forwarding table 28 to determine how to forward the network-layer packet. L3 forwarding table 28 may contain entries that map various IP addresses to various ones of line cards 20 or to control module 24. For example, L3 forwarding table 28 may contain an entry that maps the IP address "12.34.56.78" to line card 20N. When forwarding engine 22 receives a network-layer packet that specifies an IP address, forwarding engine 22 may scan through L3 forwarding table 28 in order to find an entry that maps this IP address to one of line cards 20 or to control module 24. Forwarding engine 22 may then forward the network-layer packet to one of line cards 20 or to control module 24, as specified by the entry in L3 forwarding table. If forwarding engine 22 forwards the network-layer packet to one of line cards 20, the line card may then forward the network-layer packet on the network link coupled to the line card. Continuing the previous example, if forwarding engine 22 receives a network-layer packet that specifies a destination IP address of "12.34.56.78", forwarding engine 22 may forward the network-layer packet to line card 20N.

Control module 24 may comprise a device discovery module 30, a topology model 32, a master election module 34, a routing engine 36, and a forwarding instruction reception module 38. As described in detail with regard to FIG. 3, device discovery module 30 automatically identifies a set of L2 devices that are capable of participating in a virtual switch, even when these devices are coupled to one another in an arbitrary network topology. When device discovery module 30 identifies a set of devices that are capable of participating as part of a virtual switch, device discovery module 30 may store topology information in topology model 32.

Topology model 32 may include an entry for each switch that is to participate in a virtual switch. The entry in topology model 32 for a switch may specify an IP address or MAC address of the switch. In addition, the entry for a switch may specify IP addresses or MAC addresses of each device that neighbors the switch. Furthermore, the entry for a switch may specify configuration parameters that describe a configuration of the switch. The configuration parameters may specify information such as available memory, processing speed, version numbers of installed software, serial numbers, manufacturer name, and other parameters that describe the configuration of a switch.

Master election module 34 in switch 4A may use the configuration parameters in topology model 32 to identify a master switch of a virtual switch. For instance, master election module 34 may identify and elect a master switch by using configuration parameters in topology model 32 to progressively eliminate ones of the participating switches from contention to be the master switch. For example, master election module 34 may use configuration parameters in topology model 32 to eliminate from contention those participating switches that do not have the greatest processing speed. If there is more than one remaining switch, master election module 34 may eliminate from contention those switches that have not been online for the longest time. By using configuration parameters in this fashion, master election module 34 may progressively narrow the field of candidate switches until master election module 34 identifies a single participating switch. Master election module 34 may then identify this switch as the master switch. Because participating switches in network 3 receive the same topology information and perform the same process to identify the master switch, each of the participating switches typically elect the same master switch.

In addition, master election module 34 of the switching devices may independently elect a backup master switch. The backup master switch may be the last switch eliminated in the master identification process described above. In the event that the master switch fails, the backup master switch may automatically begin operating as the master switch.

If master election module 34 determines that switch 4A is the master switch, master election module 34 may selectively enable certain features for supporting L3 routing and control within each of the L2 switches. In this way, the master switch may have L3 control-plane features enabled and the non-master switches (i.e., slave switches) may have their L3 control-plane functionality disabled. For example, master election module 34 may enable routing engine 36 and disable forwarding instruction reception module 38. Otherwise, if master election module 34 determines that switch 4A is not the master switch, master election module 34 may disable routing engine 36 and may enable forwarding instruction reception module 38 in order to receive forwarding instructions from the master switch.

When routing engine 36 is enabled, routing engine 36 automatically generates and distributes forwarding information to the L2 switches that are capable of participating as part of a virtual switch. As described in detail with regard to FIG. 4, routing engine 36 may use topology model 32 to generate an L2 forwarding table for switching operations within the L2 network, and/or an L3 forwarding table for routing operations within the L3 network for each participating switch in the virtual switch. For instance, in the example of FIG. 2, routing engine 36 may store L2 forwarding information in L2 forwarding table 26 and may store L3 forwarding information in L3 forwarding table 28.

For slave L2 switches, forwarding instruction reception module 38 is enabled, and forwarding instruction reception module 38 may receive L2 forwarding instructions and/or L3 forwarding instructions from the master switch. When forwarding instruction reception module 38 receives L2 forwarding instructions, forwarding instruction reception module 38 may copy the L2 forwarding instructions into L2 forwarding table 26. When forwarding instruction reception module 38 receives L3 forwarding instructions, forwarding instruction reception module 38 may copy the L3 forwarding instructions into L3 forwarding table 28. In this way, forwarding instruction reception module 38 may enable a table generation module of the master switch to store forwarding information in switch 4A.

Figure 3:
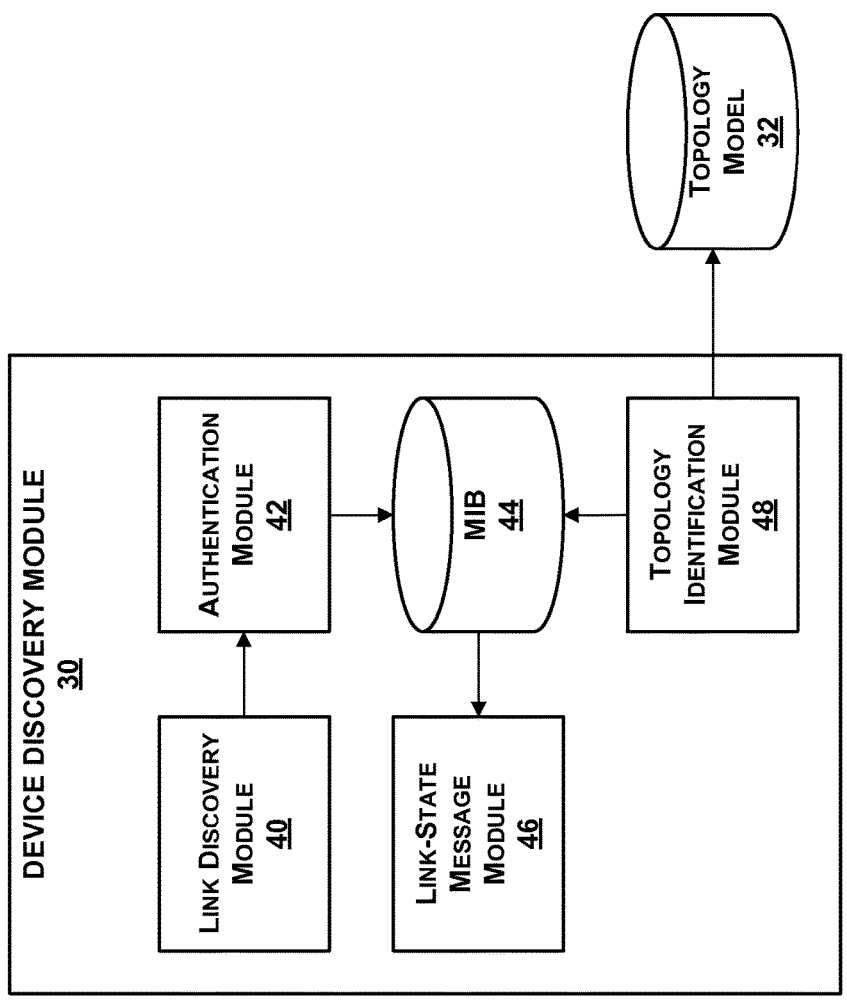
FIG. 3 is a block diagram illustrating exemplary details of a device discovery module of the switch.

FIG. 3 is a block diagram illustrating exemplary details of device discovery module 30. As illustrated in the example of FIG. 3, device discovery module 30 may comprise a link discovery module 40 that utilizes L2 network communications to determine the L2 topology of the network. Link discovery module 40 may automatically send LLDP data units to devices that neighbor switch 4A. The LLDP data units sent by link discovery module 40 may specify configuration parameters regarding switch 4A. The configuration parameters may include Type-Length-Value (TLV) fields that indicate that switch 4A is capable of participating in a virtual switch. In this way, switch 4A may "advertise" to neighboring devices in network 3 that switch 4A is capable of participating in a virtual switch. Link discovery module 40 may cause each of line cards 20 to rebroadcast this LLDP data unit on a periodic basis. For example, link discovery module 40 may cause each of line cards 20 to rebroadcast the LLDP data unit once every few seconds.

Furthermore, line cards 20 may receive LLDP data units. When line cards 20 receive LLDP data units, line cards 20 may forward to LLDP data units to forwarding engine 22 and forwarding engine 22 may forward the LLDP data units to an authentication module 42. When authentication module 42 receives an LLDP data unit, authentication module 42 may authenticate the sender of the LLDP data unit. For example, authentication module 42 may transmit a random number to the device that sent the LLDP data unit. If the device that sent the LLDP data unit sends back a copy of the random number that has been encrypted using a particular private encryption key, authentication module 42 may accept the LLDP data unit and store the configuration parameters in the LLDP data unit in a management information base (MIB) 44. MIB 44 may also store configuration parameters of switch 4A. Otherwise, if the device that sent the LLDP data unit does not send back a copy of the random number that has been encrypted using the particular private encryption key, authentication module 42 may reject the LLDP data unit and does not store the configuration parameters in the LLDP data unit in MIB 44.

A link-state message module 46 in device discovery module 30 utilizes L3 network communications to exchange the information in MIB 44 with the other participating network switches. For example, link-state message module 46 may generate link-state advertisement messages. These link-state advertisement messages may be formatted as network-layer (L3) routing protocol messages. For example, link-state message module 46 may format link-state advertisement messages as IS-IS routing protocol messages, Open Shortest Path First (OSPF) routing protocol messages, Router Information Protocol (RIP) messages. Other L3 protocols may be used, such as Border Gateway Protocol (BGP) messages, Constrained Shortest Path First protocol messages, Interior Gateway Routing Protocol (IGRP) messages, Enhanced IGRP messages, or other interior or exterior routing protocols.

The link-state advertisement messages generated by link-state message module 46 may specify L2 configuration parameters stored in MIB 44. As discussed above, MIB 44 may store L2 configuration parameters about switch 4A and L2 configuration parameters about each device that neighbors sending switch 4A. For instance, the L2 configuration parameters may indicate whether switch 4A and devices that neighbor switch 4A (e.g., switch 4B, device 6A, and device 6B) are capable of participating as part of a virtual switch. In addition, the L2 configuration parameters in the link-state advertisement message may include L2 configuration parameters that may be used to determine the relative qualifications of the participating switches to serve as the master switch. The link-state advertisement messages may also include a field that specifies that switch 4A produced the link-state advertisement message and a sequence number. This sequence number may increase each time topology identification module 48 generates a new link-state advertisement message.

Other switches in network 3 may send link-state advertisement messages to switch 4A. When one of line cards 20 receives a link-state advertisement message from another one of switches 4, the line card may forward the link-state advertisement message to forwarding engine 22 and forwarding engine 22 may forward the link-state advertisement message to a topology identification module 48 in device discovery module 30. When topology identification module 48 receives a link-state advertisement message, topology identification module 48 determines whether a sequence number in the link-state advertisement message is greater than a sequence number in a link-state advertisement message previously received from the sending switch. If the sequence number in the link-state advertisement message is greater than a sequence number in a link-state advertisement message previously received from switch 4A, topology identification module 48 may incorporate the L2 configuration parameters in the link-state advertisement message into topology model 32 and may forward the link-state advertisement on all of line cards 20 other than the one of line cards 20 that initially received the link-state advertisement message. If the sequence number in the link-state advertisement message is not greater than a sequence number in a link-state advertisement message previously received from switch 4A, topology identification module 48 does not incorporate the information in the link-state advertisement message into topology model 32 and does not forward the link-state advertisement message. In this way, each device in network 3 receives the link-state advertisement message. Furthermore, in this way, topology model 32 stores L2 configuration parameters of each of switches 4, devices that neighbor switches 4, and possibly other devices in network 3.

Figure 4:
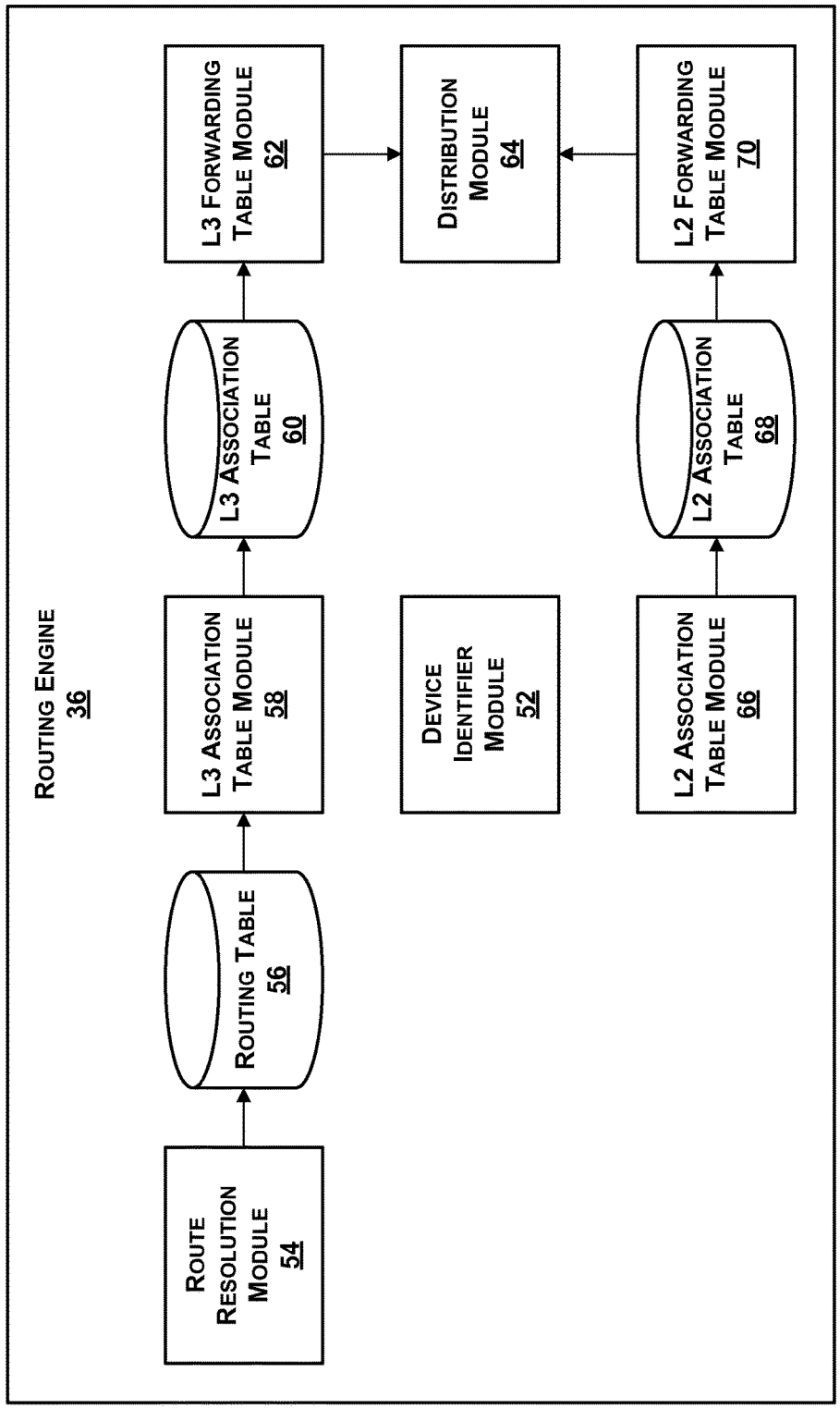
FIG. 4 is a block diagram that illustrates exemplary details of table generation module of the switch.

FIG. 4 is a block diagram that illustrates exemplary details of routing engine 36. As illustrated in the example of FIG. 4, routing engine 36 may comprise a device identifier module 52. When master election module 34 enables routing engine 36, device identifier module 52 distributes device identifiers to the devices that are participating in the virtual switch. The devices in the virtual switch may use these device identifiers to associate device portions of interface identifiers with specific devices in the virtual switch.

Routing engine 36 may also comprise a route resolution module 54. Route resolution module 54 may use topology model 32 to create a routing table 56. Routing table 56 may include entries that map various destination IP addresses to various "next-hop" IP addresses. A "next-hop" IP address is an IP address associated with a first node along a route from a network interface of one of the participating switches to a node associated with the destination IP address. For example, the IP address "23.12.121.03" may be associated with device 6G and the IP address "65.24.57.123" may be associated with device 6C. In this example, routing table 56 may include an entry for a route from network interface 8F of switch 4B to device 6G that maps "23.12.121.03" to the "65.24.57.123". Routing table 56 may also store route information specified by an administrator of switch 4A.

An L3 association table module 58 may use routing table 56 to create an L3 association table 60. L3 association table 60 may include entries that map various destination IP addresses to various network interfaces of the participating switches. For example, L3 association table module 58 may create an entry in L3 association table 60 that maps the IP address "23.12.121.03" to network interface 8F of switch 4B. L3 association table module 58 may create entries in L3 association table 60 by scanning through topology model 32 in order to identify a network interface that is on the same network segment as a node that is associated with the destination IP address. In this way, L3 association table module 58 associates IP addresses with network interfaces of participating switches.

An L3 forwarding table module 62 may use L3 association table 60 to generate an L3 forwarding table for each of the participating switches. In order to generate an L3 forwarding table for each of the participating switches, L3 forwarding table module 62 may identify network interfaces of the participating switches that are on the same network segments as other ones of the participating switches. In the example of FIG. 1, L3 forwarding table module 62 may identify network interface 8C of switch 4A as being on the same network segment as switch 4B, may identify network interface 8E of switch 4B as being on the same network segment as switch 4A, may identify network interface 8H of switch 4B as being on the same network segment as switch 4C, and may identify network interface 8J of switch 4C as being on the same network segment as switch 4B. L3 forwarding table module 62 may then identify a loop-free path among the identified network interfaces that includes a network interface of each of the participating switches. For example, L3 forwarding table module 62 may identify a path from network interface 8C of switch 4A to network interface 8E of switch 4B to network interface 8H of switch 4B to network interface 8J of switch 4C.

When L3 forwarding table module 62 is creating an L3 forwarding table for a first one of the participating switches, L3 forwarding table module 62 may scan through L3 association table 60. For each entry in L3 association table 60, L3 forwarding table module 62 may determine whether the entry maps an IP address to a network interface of the first one of the participating switches. If the entry maps an IP address to a network interface of the first one of the participating switches, L3 forwarding table module 62 may create an entry in the L3 forwarding table of the first one of the participating switches that maps the IP address to the network interface of the first one of the participating switches. Otherwise, if the entry maps an IP address to a network interface of a second one of the participating switches, L3 forwarding table module 62 may create an entry in the L3 forwarding table of the first one of the participating switches that maps the IP address to the network interface of the first one of the participating switches that is on the identified path in the direction of the second one of the participating switches. For example, if switch 4A is the first one of the participating switches and switch 4C is the second one of the participating switches, L3 forwarding table module 62 may create an entry in the L3 forwarding table of switch 4A that maps the IP address to interface 8C of switch 4A because interface 8C of switch 4A is on the identified path in the direction of switch 4C. After L3 forwarding table module 62 creates an L3 forwarding table for each of the participating switches, a distribution module 64 may store the L3 forwarding tables in appropriate ones of the participating switches.

Routing engine 36 may also include an L2 association table module 66. L2 association table module 66 may use topology model 32 to create entries in an L2 association table 68. Entries in L2 association table 68 may map MAC addresses to network interfaces of the participating switches. For example, an entry in L2 association table 68 may map the MAC address "00-08-74-4C-7F-1D" to interface 8F of switch 4B. In order to create entries in L2 association table 68, L2 association table module 66 may scan through entries in topology model 32. As discussed above, topology model 32 includes an entry for each one of the participating switches. When L2 association table module 66 scans as entry in topology model 32 for a participating switch, L2 association table module 66 may create an entry in L2 association table 68 for each node that the entry specifies as being connected to the participating switch.

After L2 association table module 66 finishes creating entries in L2 association table 68, an L2 forwarding table module 70 may use the entries in L2 association table 68 to generate an L2 forwarding table for each of the participating switches. Entries in an L2 forwarding table for one of the participating switches may map MAC addresses to network interfaces of the participating switch. In order to create entries in the L2 forwarding tables of the participating switches, L2 forwarding table module 70 may identify a path among the network interfaces of the participating switches. L2 forwarding table module 70 may use the same operation described above with regard to L3 forwarding table module 62 to identify this path.

When L2 forwarding table module 70 is creating an L2 forwarding table for a first one of the participating switches, L2 forwarding table module 70 may scan through L2 association table 68. For each entry in L2 association table 68, L2 forwarding table module 70 may determine whether the entry maps a MAC address to a network interface of the first one of the participating switches. If the entry maps a MAC address to a network interface of the first one of the participating switches, L2 forwarding table module 70 may create an entry in the L2 forwarding table of the first one of the participating switches that maps the MAC address to the network interface of the first one of the participating switches. Otherwise, if the entry maps a MAC address to a network interface of a second one of the participating switches, L2 forwarding table module 70 may create an entry in the forwarding table of the first one of the participating switches that maps the MAC address to the network interface of the first one of the participating switches that is on the identified path in the direction of the second one of the participating switches. For example, if switch 4A is the first one of the participating switches and switch 4B is the second one of the participating switches, L2 forwarding table module 70 may create an entry in the L2 forwarding table of switch 4A that maps the MAC address to interface 8C of switch 4A because interface 8C of switch 4A is on the identified path in the direction of switch 4B. After L2 forwarding table module 70 creates an L2 forwarding table for each of the participating switches, distribution module 64 may store the L2 forwarding tables in appropriate ones of the participating switches.

Figure 5:
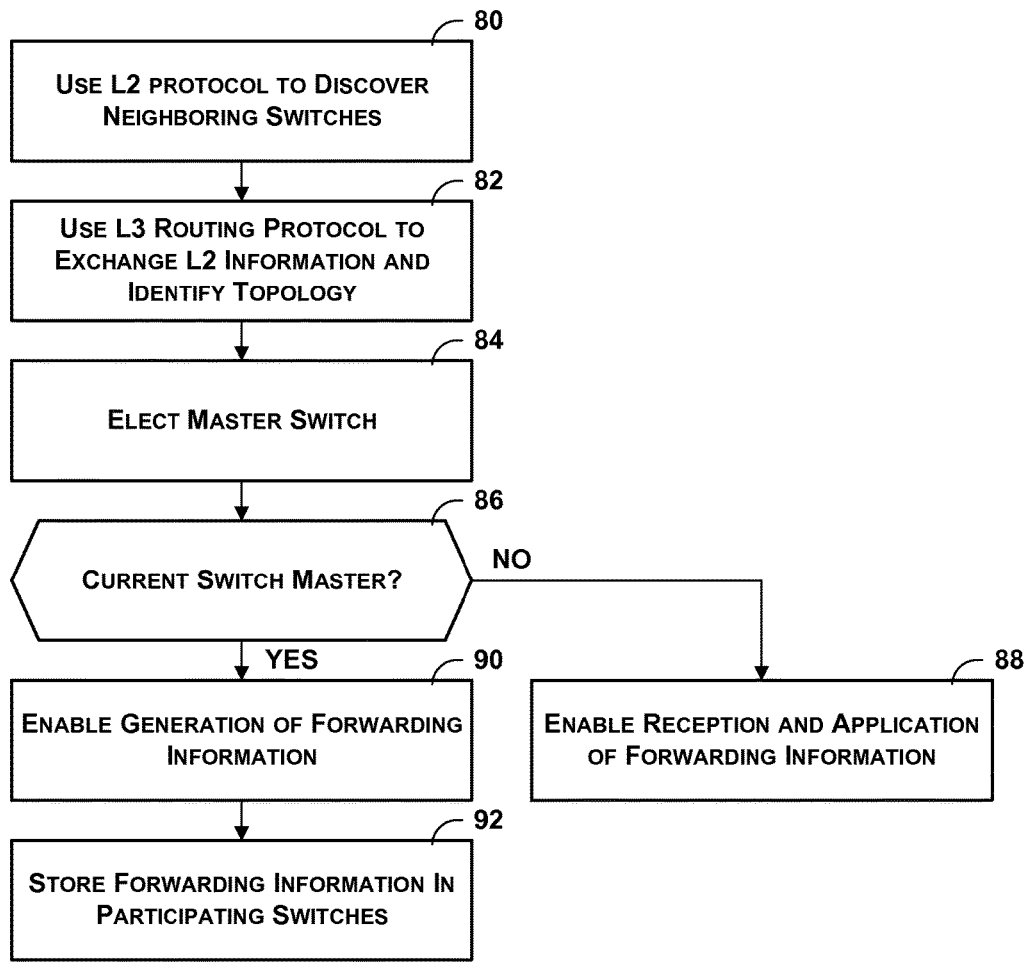
FIG. 5 is a flowchart illustrating an exemplary operation of the switch to configure switches to operate a virtual switch.

FIG. 5 is a flowchart illustrating an exemplary operation of switch 4A to configure a set of L2 network switches 4 to participate in a virtual switch. Initially, device discovery module 30 may use a link-layer discovery protocol to identify neighboring L2 switches that are capable of participating in a virtual switch, e.g., a logically stacked set of L2 switches capable of operating as a single L2 switch (80). For example, device discovery module 30 may cause each of line cards 20 to broadcast LLDP data units. Furthermore, device discovery module 30 may cause each of line cards 20 to receive LLDP data units from neighboring devices. For instance, switch 4A may receive LLDP data units from switch 4B and devices 6A and 6B.

After device discovery module 30 uses the link-layer discovery protocol to identify neighboring devices that are capable of participating in a virtual switch, device discovery module 30 may use a network-layer protocol to exchange the L2 information and to identify the overall topology of network 3 (82). In order to identify the topology of network 3, device discovery module 30 may use the IS-IS routing protocol to output link-state advertisement messages that include the L2 configuration parameters in MIB 44 for neighboring devices. Device discovery module 30 may store information that describes the topology of network 3 in topology model 32.

When device discovery module 30 has identified the topology of network 3, master election module 34 may use topology model 32 to elect one of the L2 switches to serve as the master switch of the virtual switch (84). Next, master election module 34 of each switch determines if the given switch is the elected master switch (86). If master election module 34 determines that given switch is not to act as the master switch ("NO" of 86), the master election module 34 of that switch enables forwarding instruction reception module 38 to receive forwarding instructions from the master switch (88). In addition, master election module 34 may disable routing engine 36, thereby disabling any L3 control-plane functionality.

On the other hand, if master election module 34 determines that switch 4A is to act as the master switch ("YES" of 86), master election module 34 may enable routing engine 36, thereby enabling routing engine 36 and its L3 control-plane functionality to generate forwarding information (90). This forwarding information may include link-layer forwarding information, network-layer forwarding information, and/or other types of forwarding information. After routing engine 36 generates the forwarding information, routing engine 36 may store the forwarding information in each one of switches 4 that is to participate in the virtual switch (92).

Figure 6:
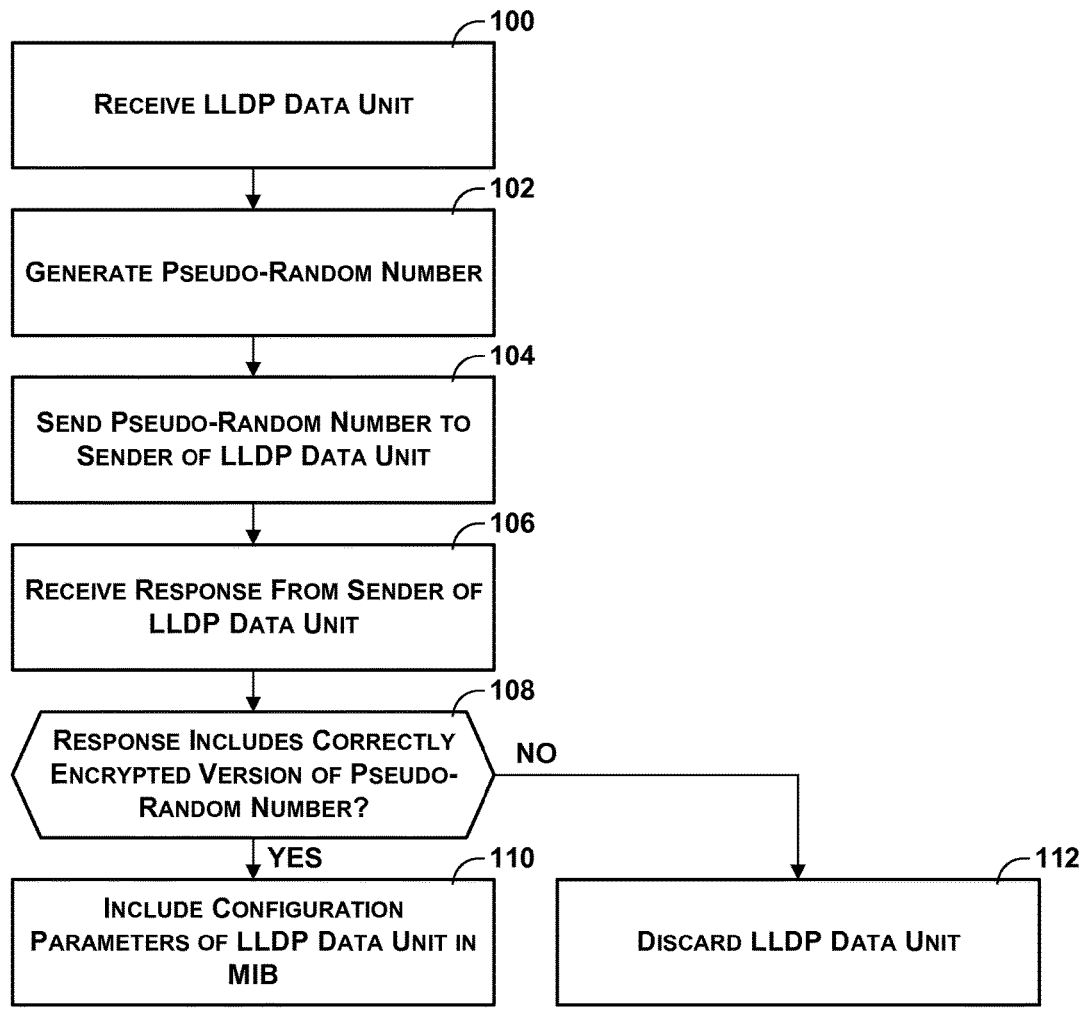
FIG. 6 is a flowchart illustrating an exemplary operation of an authentication module.

FIG. 6 is a flowchart illustrating an exemplary operation of authentication module 42. Initially, authentication module 42 may receive an LLDP data unit from a neighboring device that claims to be a switch that is capable of participating as part of a virtual switch (100). When authentication module 42 receives such an LLDP data unit, authentication module 42 may generate a pseudo-random number (102). Authentication module 42 may then send this pseudo-random number to the neighboring switch (104). The neighboring device may be configured to use a particular encryption key that is also known to authentication module 42. For instance, all switches manufactured by a particular manufacturer may be configured with this encryption key. When the neighboring device receives the random number, the neighboring device may encrypt the random number using the encryption key and sends the encrypted random number back to switch 4A. Authentication module 42 may then receive this response from the neighboring device (106).

When authentication module 42 receives this response from the neighboring device, authentication module 42 may determine whether the response includes a correctly encrypted version of the pseudo-random number generated by authentication module 42 (108). The version of the pseudo-random number is correctly encrypted only if the pseudo-random number is encrypted with the secret encryption key. If authentication module 42 determines that the response includes a correctly encrypted version of the pseudo-random number ("YES" of 108), authentication module 42 may add to MIB 44 L2 configuration parameters in the LLDP data unit received from the neighboring switch (110). Otherwise, if authentication module 42 determines that the response does not include a correctly encrypted version of the pseudo-random number ("NO" of 108), authentication module 42 may discard the L2 configuration parameters in the LLDP data unit (112).

Figure 7:
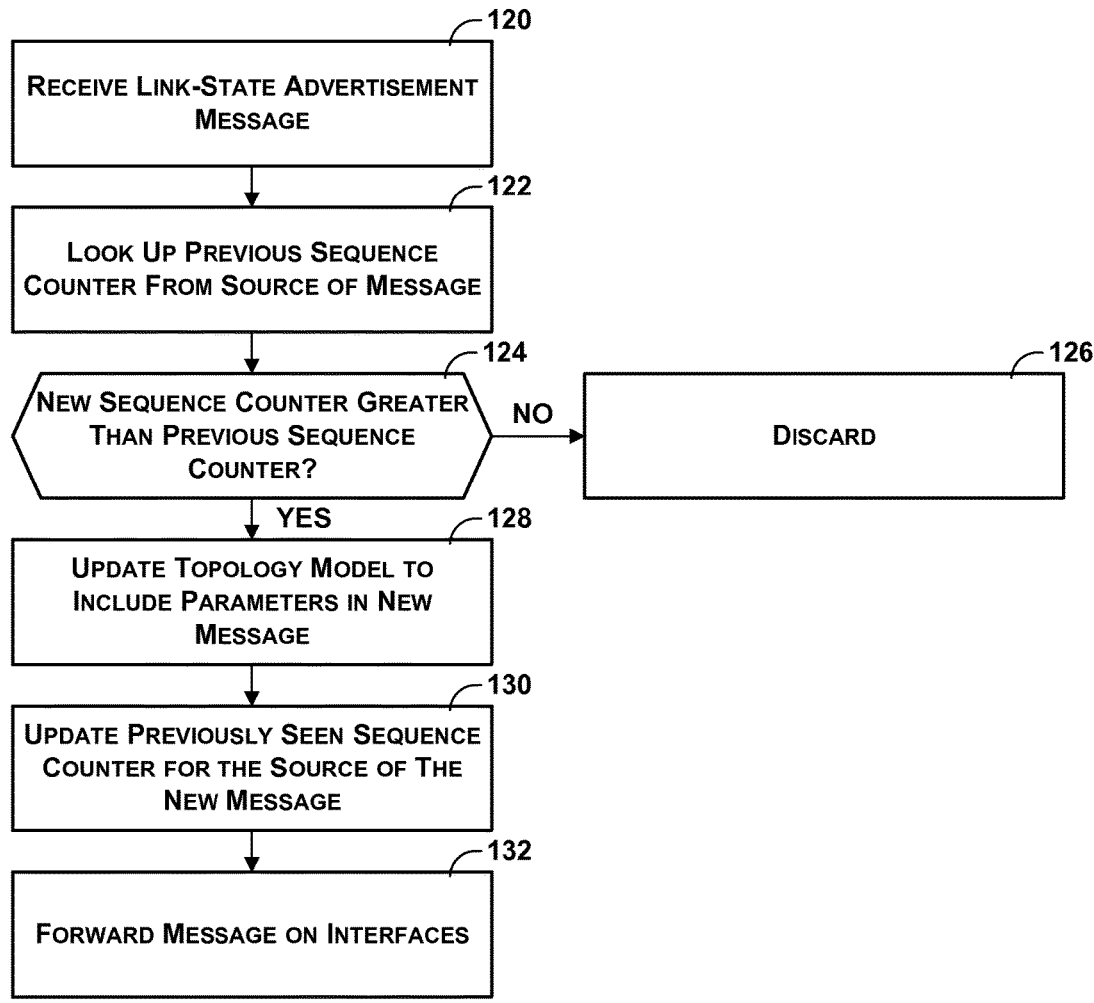
FIG. 7 is a flowchart illustrating an exemplary operation of a topology identification module.

FIG. 7 is a flowchart illustrating an exemplary operation of topology identification module 48. Initially, topology identification module 48 may receive a link-state advertisement message from a device in network 3 (120). When topology identification module 48 receives a link-state advertisement message from a device in network 3, topology identification module 48 may look up a previous sequence counter received from the sender of the link-state advertisement message (122). Topology identification module 48 may determine whether the sequence counter in the received link-state advertisement message is greater than the previous sequence counter received from the sender of the link-state advertisement message (124). If the sequence counter in the received link-state advertisement message is not greater than the previous sequence counter received from the sender of the link-state advertisement message ("NO" of 124), topology identification module 48 may discard the link-state advertisement message and perform no further action (126).

On the other hand, if the sequence counter in the received link-state advertisement message is greater than the previous sequence counter received from the sender of the link-state advertisement message ("YES" of 124), topology identification module 48 may update topology model 32 to include the L2 configuration parameters contained in the link-state advertisement message (128). In addition, topology identification module 48 may update the sequence counter associated with the sender of the link-state advertisement message to reflect the sequence counter stored in the received link-state advertisement message (130). After updating the sequence counter associated with the sender of the link-state advertisement message, topology identification module 48 may forward the message on each of line cards 20 (132).

Figure 8:
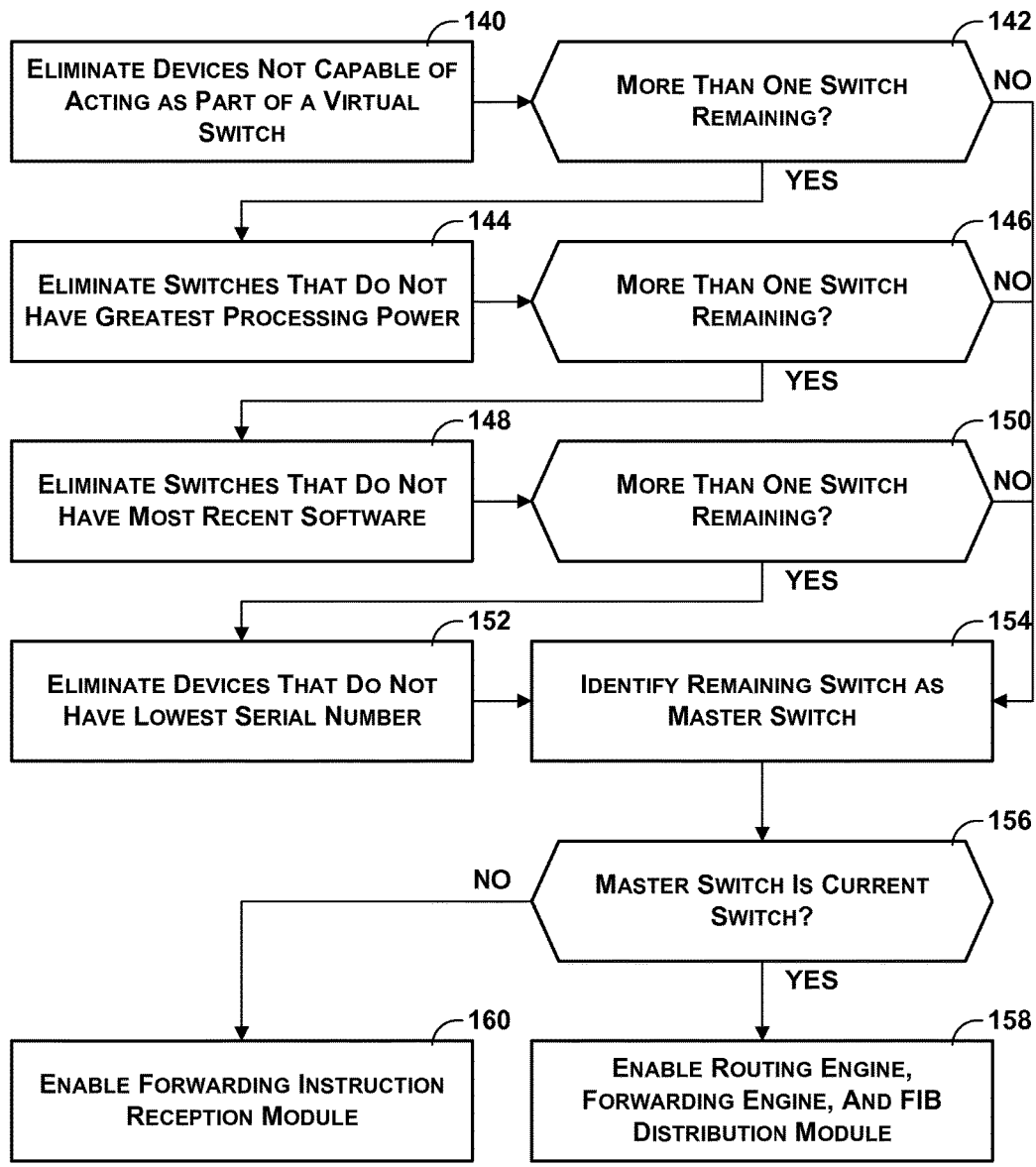
FIG. 8 is a flowchart illustrating an exemplary operation of a master election module.

FIG. 8 is a flowchart illustrating an exemplary operation of master election module 34. Initially, master election module 34 may use the L2 configuration parameters in topology model 32 to eliminate candidate devices that are not capable of participating in a virtual switch (140). For instance, master election module 34 may use the L2 configuration parameters in topology model 32 to eliminate devices 6A through 6F because devices 6A through 6F are not switches.

After master election module 34 eliminates candidate devices that are not capable of participating in the virtual switch, master election module 34 may determine whether more than one candidate switch remains (142). If more than one candidate switch remains ("YES" of 142), master election module 34 may eliminate candidate switches that do not have the greatest processing power (144). For example, the L2 configuration parameters in topology model 32 may indicate that switch 4A is capable of performing two million calculations per second and switch 4B is capable of performing one million calculations per second. In this example, master election module 34 may eliminate switch 4B because switch 4B does not have the greatest processing power.

After master election module 34 eliminates candidate devices that do not have the greatest processing power, master election module 34 may determine whether more than one candidate switch remains (146). If more than one candidate switch remains ("YES" of 146), master election module 34 may eliminate candidate switches that do not have the most recent software installed (148). For example, the configuration information in topology model 32 may indicate that version 4.2.1 of a software application is installed on switch 4A and that version 4.2.2 of the software application is installed on switch 4C. In this example, master election module 34 may eliminate switch 4A because switch 4C has more recent software installed.

When master election module 34 has eliminated candidate devices that do not have the most recent software installed, master election module 34 may determine whether more than one candidate switch remains (150). If more than one candidate switch remains ("YES" of 150), master election module 34 may eliminate candidate switches that do not have the lowest serial number (152). For example, switch 4C may have a serial number "653" and switch 4B may have a serial number "253". In this example, master election module 34 may eliminate switch 4C because switch 4C does not have the lowest serial number. Elimination of switches based on serial number may be used as an arbitrary tiebreaker. Master election module 34 may eliminate candidate switches on criteria other than those described in the example of FIG. 8.

After master election module 34 eliminates candidate switches that do not have the lowest serial numbers, master election module 34 may identify the remaining candidate switch as the master switch (154). Master election module 34 may also identify a sole remaining candidate switch as the master switch whenever master election module 34 determines that there is not more than one remaining candidate switch in steps (142), (146), and (150).

When master election module 34 has identified one of switches 4 as the master switch, master election module 34 may determine whether the master switch is switch 4A (i.e., the switch that is operating master election module 34) (156). If master election module 34 determines that the master switch is switch 4A ("YES" of 156), master election module 34 may enable routing engine 36 (158). On the other hand, if master election module 34 determines that the master switch is not switch 4A ("NO" of 156), master election module 34 may enable forwarding instruction reception module 38 (160).

Figure 9:
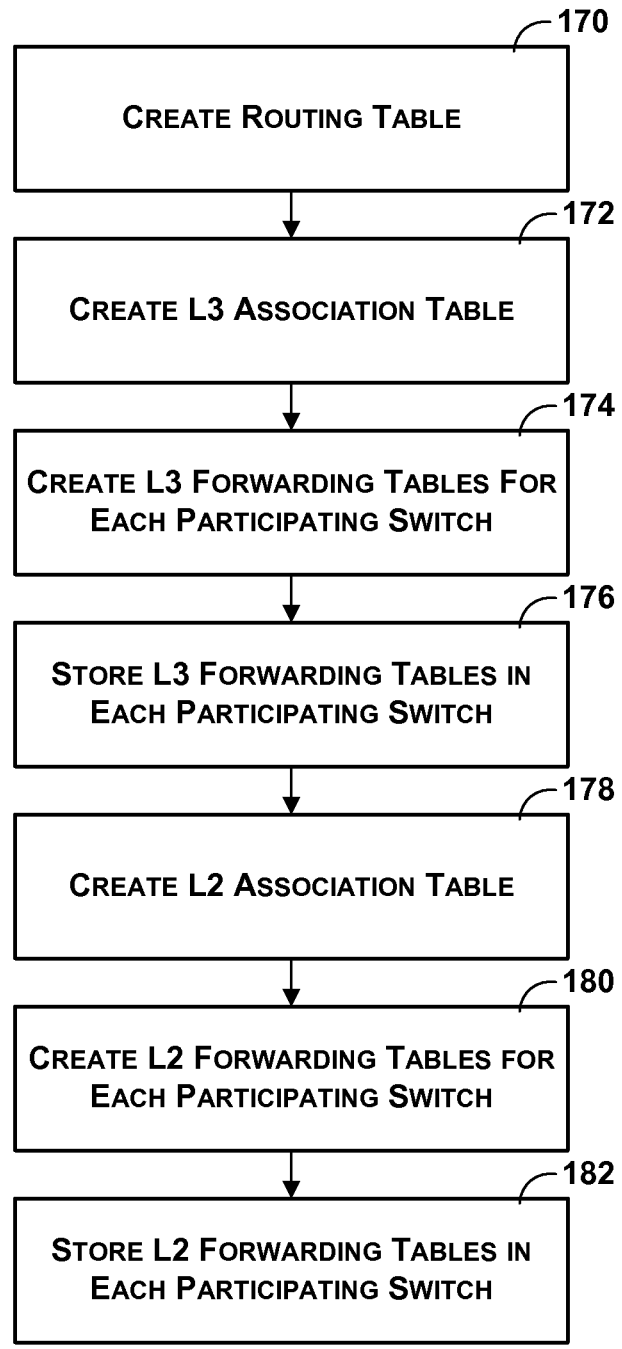
FIG. 9 is a flowchart illustrating an exemplary operation of the table generation module.

FIG. 9 is a flowchart illustrating an exemplary operation of routing engine 36 in the control module. Initially, route resolution module 54 uses topology model 32 to create routing table 56 (170). When route resolution module 54 creates routing table 56, route resolution module 54 may identify shortest paths from any network interface of any participating switch to other nodes in network 3. In order to identify such shortest paths, route resolution module 54 may use Dijkstra's algorithm or some variation thereof. In one implementation, route resolution module 54 may, for each of the identified paths, identify an IP address of the first device along the path. This IP address is the "next-hop" address of the path. Route resolution module 54 may store in routing table 56 a mapping from the target IP address of the path to the "next-hop" address of the path. In a different implementation, route resolution module 54 may, for each of the identified paths, identify a Multi-protocol Label Switching (MPLS) label associated with a path segment of the identified path. Route resolution module 54 may store in routing table 56 a mapping from the target IP address of the identified path to the MPLS label of the path.

After route resolution module 54 creates routing table 56, L3 association table module 58 may use routing table 56 and topology model 32 to create L3 association table 60 (172). In order to create L3 association table 60, L3 association table module 58 may scan through routing table 56. When L3 association table module 58 encounters an entry in routing table 56 that maps a destination IP address to a "next-hop" address, L3 association table module 58 may use topology model 32 to identify a network interface of one of the participating switches that is on the same network segment as a node associated with the "next-hop" address. For example, if an entry in routing table 56 maps a destination IP address to an IP address of device 6E, L3 association table module 58 may use topology model 32 to identify network interface 8I of switch 4C as being on the same network segment as device 6E. After identifying a network interface of one of the participating switches that is on the same network segment as a node associated with the "next-hop" address, L3 association table module 58 may store an entry in L3 association table 60 that maps the destination IP address to a network interface one of the participating switches.

When L3 association table module 58 creates L3 association table 60, L3 forwarding table module 62 may use L3 association table 60 to create an L3 forwarding table for each participating switch (174). In order to create an L3 forwarding table for a participating switch, L3 forwarding table module 58 may scan through L3 association table 60. When L3 forwarding table module 62 encounters an entry that maps a destination IP address to a network interface identifier, L3 forwarding table module 62 may identify a network interface of the participating switch that is associated with the network interface identifier. For instance, if L3 forwarding table module 62 determines that the network interface identifier specifies a network interface of the participating switch, L3 forwarding table module 62 may create an entry in the forwarding table of the participating switch that specifies a mapping from the destination IP address to the network interface of the participating switch. Otherwise, if L3 forwarding table module 62 determines that the network interface identifier specifies a network interface of another participating switch, L3 forwarding table module 62 may create an entry in the forwarding table of the participating switch that specifies a mapping from the destination IP address to a network interface of the participating switch. A switch that includes the network interface identified by the network interface identifier receives packets forwarded by this network interface. For example, if L3 forwarding table module 62 is creating the L3 forwarding table of switch 4A and encounters an entry in L3 association table 60 that maps a destination IP address to network interface 8I of switch 4C, L3 forwarding table module 62 may create an entry in the L3 forwarding table of switch 4A that maps the destination IP address to network interface 8C of switch 4A. In this example, when L3 forwarding table module 62 is creating the L3 forwarding table of switch 4B and encounters the entry in L3 association table 60 that maps the destination IP address to network interface 8I of switch 4C, L3 forwarding table module 62 may create an entry in the L3 forwarding table of switch 4B that maps the destination IP address to interface 8H of switch 4B.

After L3 forwarding table module 62 creates an L3 forwarding table for each of the participating switches, distribution module 64 may automatically store the L3 forwarding tables in each of the participating switches (176).

Next, L2 association table module 66 may use topology model 32 to create L2 association table 68 (178). In order to create L2 association table 66, L2 association table module 66 may scan through topology model 32. When L2 association table module 66 encounters an entry in topology model 32 for a device in network 3, L2 association table module 66 may create an entry in L2 association table 68 that maps a MAC address of the node to a network interface identifier that identifies a network interface of one of the participating switches.

After L2 association table module 66 creates L2 association table 68, L2 forwarding table module 70 may create an L2 forwarding table for each of the participating switches (180). In order to create an L2 forwarding table for a participating switch, L2 forwarding table module 70 may scan through L2 association table 68. When L2 forwarding table module 70 encounters an entry, L2 forwarding table module 70 may determine whether the entry maps a MAC address to an interface of the participating switch. If L2 forwarding table module 70 determines that the network interface identifier specifies a network interface of the participating switch, L2 forwarding table module 70 may create an entry in the forwarding table of the participating switch that specifies a mapping from the destination MAC address to the network interface of the participating switch. Otherwise, if L2 forwarding table module 70 determines that the network interface identifier specifies a network interface of another participating switch, L2 forwarding table module 70 may create an entry in the L2 forwarding table of the participating switch that specifies a mapping from the destination MAC address to a network interface of the participating switch. A switch that includes the network interface identified by the network interface identifier receives frames forwarded by this network interface.

After L2 forwarding table module 70 creates an L2 forwarding table for each of the participating switches, distribution module 64 may store the L2 forwarding tables in the participating switches (182).

The functions described in this disclosure may be implemented in hardware, software, firmware, or any combination thereof. If implemented in software, the functions may be stored as one or more instructions or code on a computer-readable medium. Computer-readable media includes both computer storage media and communication media. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and blu-ray disc where "disks" usually reproduce data magnetically, while "discs" reproduce data optically with lasers. Combinations of the above should also be included within the scope of computer-readable media.

Various embodiments of the invention have been described. These and other embodiments are within the scope of the following claims.

The invention claimed is:

1. A method comprising:
exchanging, in accordance with a network protocol, messages between a plurality of switching devices within a network, wherein the messages include configuration information indicating whether each of the respective switching device is capable of participating as part of a virtual switch, and wherein the messages further includes an indication of a processing power for the respective switching devices; and
electing, responsive to the messages, one of the switching devices as a master switch for the virtual switch based at least in part on the configuration information and the processing power for each of the switching devices.

2. The method of claim 1, further comprising generating forwarding information by the master switch and communicating the forwarding information to the non-elected switching devices of the virtual switch to control switching of L2 network communications by each of the switching devices.

3. The method of claim 1, wherein the network protocol comprises a link-layer discovery protocol (LLDP) or a layer three (L3) routing protocol.

4. The method of claim 1, wherein all of the switches of the virtual switch actively switch network traffic when participating as the virtual switch.

5. A method comprising:
exchanging, in accordance with a network protocol, messages between a plurality of switching devices within a network, wherein the messages include configuration information indicating whether the respective switching device is capable of participating as part of a virtual switch in which all of the switching devices of the virtual switch are actively switching network traffic; and
electing, responsive to the messages, one of the switching devices as a master switch for the virtual switch, by progressively eliminating ones of the switching devices from contention to be the master switch based on a comparison of the configuration information contained within the messages to on one or more criteria.

6. The method of claim 5, further comprising generating forwarding information by the master switch and communicating the forwarding information to the non-elected switching devices of the virtual switch to control switching of L2 network communications by each of the switching devices.

7. A system comprising:
a plurality of physical switching devices to switch layer two (L2) network communications within an L2 network as a single virtual switch;
wherein the switching devices are configured to execute network protocol to exchange messages,
wherein each of the messages include configuration information indicating whether the respective switching device sending the message is capable of participating as part of a virtual switch and further includes an indication of a processing power for the respective switching device sending the message, and
wherein the switching devices are configured to elect one of the switching devices as a master switch for the virtual switch based on the respective configuration information for each of the switching devices and based, at least in part, on the respective processing power of each of the switching devices.

8. The system of claim 7, wherein, responsive to the messages, the master switch is configured to generate forwarding information and communicate the forwarding information to the non-elected switching devices of the virtual switch to control switching of L2 network communications by each of the switching devices.

9. The system of claim 7, wherein the network protocol comprises a link-layer discovery protocol (LLDP) or a layer three (L3) routing protocol.

10. The system of claim 7, wherein all of the switches of the virtual switch actively switch network traffic when participating as the virtual switch.

11. A system comprising:
a plurality of physical switching devices operable to switch layer two (L2) network communications within an L2 network as a single virtual switch;
wherein the switching devices are configured to execute network protocol to exchange messages,
wherein each of the messages include configuration information indicating whether the respective switching device sending the message is capable of participating as part of a virtual switch in which all of the switching devices of the virtual switch are actively switching network traffic, and
wherein the switching devices are configured to elect one of the switching devices as a master switch for the virtual switch based on the respective configuration information for each of the switching devices by progressively eliminating ones of the switching devices from contention to be the master switch based on a comparison of the configuration information contained within the messages to on one or more criteria.

12. The system of claim 11, wherein, responsive to the messages, the master switch is configured to generate forwarding information and communicate the forwarding information to the non-elected switching devices of the virtual switch to control switching of L2 network communications by each of the switching devices.

13. A device comprising:
a plurality of network interfaces;
a processor configured to execute a network protocol to receive messages from a set of switching devices within a network,
wherein each of the messages received from the switching devices include configuration information indicating whether the respective switching device sending the message is capable of participating as part of a virtual switch,
wherein each of the messages includes an indication of a processing power for the respective switching device that sent the message, and
wherein, responsive to the messages, the processor is configured to elect one of the set of switching devices as a master switch for the virtual switch based at least in part on the configuration information and on the respective processing power of each of the switching devices.

14. The device of claim 13, wherein, responsive to the messages and election as the master switch, the processor is configured to generate forwarding information and communicate the forwarding information to the non-elected switching devices of the virtual switch.

15. The device of claim 13, wherein the network protocol comprises a link-layer discovery protocol (LLDP) or a layer three (L3) routing protocol.

16. The device of claim 13, wherein all of the switches of the virtual switch actively switch network traffic when participating as the virtual switch.

17. A device comprising:

a plurality of network interfaces;

a processor configured to execute a network protocol to receive messages from a set of switching devices within a network, wherein each of the messages received from the switching devices include configuration information indicating whether the switching device sending the message is capable of participating as part of a virtual switch in which all of the switching devices of the virtual switch are actively switching network traffic, and wherein the processor elects one of the set of switching devices as a master switch for the virtual switch by progressively eliminating ones of the switching devices from contention to be the master switch based on a comparison of the configuration information contained within the messages to on one or more criteria.

18. The device of claim 17, wherein, responsive to the messages and election as the master switch, the processor is configured to generate forwarding information and communicate the forwarding information to the non-elected switching devices of the virtual switch.

* * * * *